(12) United States Patent
Sekido et al.

(10) Patent No.: US 8,928,279 B2
(45) Date of Patent: Jan. 6, 2015

(54) ELECTRIC VEHICLE STRUCTURE

(75) Inventors: Kiyohito Sekido, Yokohama (JP); Satoshi Shigematsu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 427 days.

(21) Appl. No.: 13/263,918

(22) PCT Filed: Apr. 13, 2010

(86) PCT No.: PCT/IB2010/000814
§ 371 (c)(1),
(2), (4) Date: Oct. 11, 2011

(87) PCT Pub. No.: WO2010/119327
PCT Pub. Date: Oct. 21, 2010

(65) Prior Publication Data
US 2012/0038319 A1  Feb. 16, 2012

(30) Foreign Application Priority Data
Apr. 15, 2009  (JP) .................... 2009-098779

(51) Int. Cl.
*H01M 10/46* (2006.01)
*B60L 11/18* (2006.01)

(52) U.S. Cl.
CPC ........... *B60L 11/1809* (2013.01); *B60L 11/185* (2013.01); *Y02T 10/7005* (2013.01); *Y02T 10/7088* (2013.01); *Y02T 90/128* (2013.01); *Y02T 90/14* (2013.01)
USPC ....................................... 320/109

(58) Field of Classification Search
CPC ....................................... Y02T 90/14

USPC .......................... 320/109, 104, 111, 107, 115
See application file for complete search history.

(56) References Cited

U.S. PATENT DOCUMENTS

| | | | |
|---|---|---|---|
| 5,202,617 A * | 4/1993 | Nor | 320/130 |
| 5,548,200 A * | 8/1996 | Nor et al. | 320/109 |
| 8,028,780 B2 * | 10/2011 | Sagawa et al. | 180/65.27 |
| 8,427,103 B2 * | 4/2013 | Ohtomo | 320/109 |
| 2009/0159237 A1* | 6/2009 | Kuwabara et al. | 165/41 |
| 2009/0242291 A1* | 10/2009 | Sagawa et al. | 180/65.265 |
| 2012/0019206 A1* | 1/2012 | Sekido et al. | 320/109 |

FOREIGN PATENT DOCUMENTS

| | | |
|---|---|---|
| JP | H11-332003 | 11/1999 |
| JP | 2006-275165 A | 10/2006 |
| JP | 2008-211943 A | 9/2008 |
| JP | 2009-025128 A | 2/2009 |

OTHER PUBLICATIONS

Machine Translation of Yoshioka (JP 2008-211943).*

(Continued)

*Primary Examiner* — Edward Tso
(74) *Attorney, Agent, or Firm* — Global IP Counselors, LLP

(57) ABSTRACT

An electric vehicle structure is provided with a charging port, an electric charging harness and an intermediate connector. The charging port is configured to be provided on a portion of a vehicle. The electric charging harness includes a first wiring portion electrically connected to the charging port and a second wiring portion configured to be connected to an electrical component of the vehicle. The intermediate connector releasably connects the first wiring portion of the electric charging harness to the second wiring portion of the electric charging harness with a repeatable connecting and disconnecting connection.

16 Claims, 4 Drawing Sheets

(56) References Cited

OTHER PUBLICATIONS

An English translation of the Chinese Office Action for the corresponding Chinese Application No. 201080015733.2, issued on Nov. 5, 2013.

A Written Opinion of the International Search Authority for International Application No. PCT/IB2010/000814, dated Jul. 5, 2010, mailed Jul. 13, 2010.

A Written Opinion of the International Preliminary Examining Authority for International Application No. PCT/IB2010/000814 mailed Aug. 23, 2011.

* cited by examiner

ELECTRIC VEHICLE STRUCTURE

CROSS-REFERENCE TO RELATED APPLICATIONS

This application is a U.S. National stage of International Application No. PCT/IB2010/000814, filed Apr. 13, 2010, which claims priority to Japanese Patent Application No. 2009-098779, filed on Apr. 15, 2009. The entire disclosure of Japanese Patent Application No. 2009-098779 is hereby incorporated herein by reference.

BACKGROUND

1. Field of the Invention

The present invention relates to a wiring structure for an electric vehicle. More specifically, the present invention relates to an electric vehicle structure having a charging port with a wiring harness connected to the charging port.

2. Background Information

Electric vehicles are sometimes provided with a charging port provided on a front end portion of the vehicle. The charging port is configured to be connected to a plug of a power supply line such that electric power can be supplied to a battery through the charging port and a harness. The harness electrically couples the charging port to the battery.

SUMMARY

It has been discovered that with the structure presented in Japanese Laid-Open Patent Publication No. 11-332003, the work of changing (replacing) the charging port is time consuming, which is inconvenient when the charging port needs to be changed for some reason. More specifically, if the harness is connected directly to the charging port, then it is necessary to change the entire harness or to disconnect a conductor of the harness from the old charging port and reconnect it to a terminal of the new charging port in order to change the charging port. Consequently, the task of changing the charging port is time consuming. Meanwhile, if the harness is connected to the charging port with a connector, then there is the possibility that the connector will become damaged along with the charging port in a situation in which the charging port is damaged due to a vehicle collision or other incident. In such a case, it is necessary to reattached a connector to the harness and, again, the task of replacing the charging port requires time and effort.

Therefore, one object of the present invention is to provide a wiring structure for an electric vehicle that can reduce the amount of time and effort required to replace a charging port connected to a wiring harness.

In view of the state of the known technology, one aspect of the present invention is to provide an electric vehicle structure that mainly comprises a charging port, an electric charging harness and an intermediate connector. The charging port is configured to be provided on a portion of a vehicle. The electric charging harness includes a first wiring portion electrically connected to the charging port and a second wiring portion configured to be connected to an electrical component of the vehicle. The intermediate connector releasably connects the first wiring portion of the electric charging harness to the second wiring portion of the electric charging harness with a repeatable connecting and disconnecting connection.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
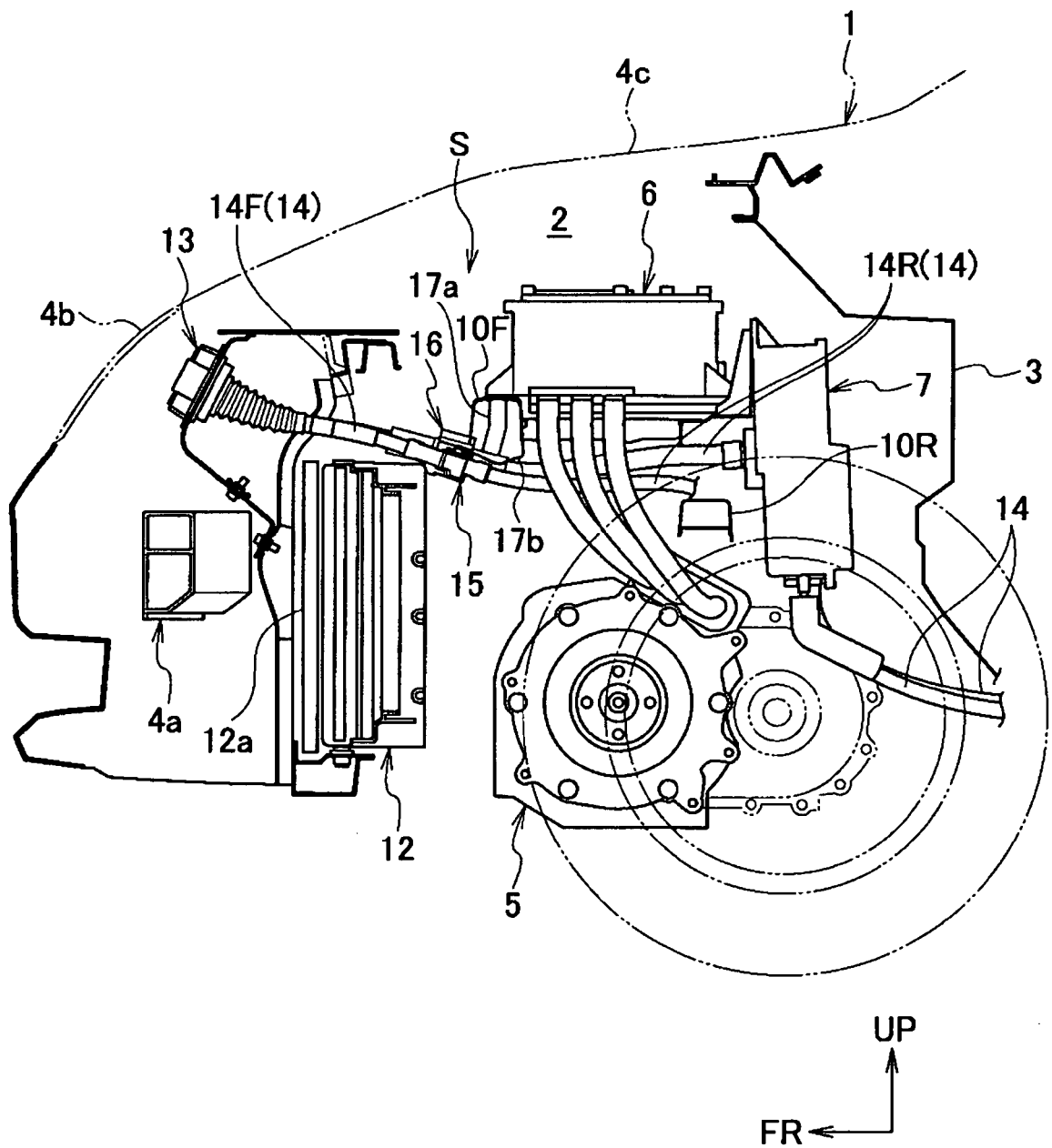
FIG. 1 is a side elevational view of an electric vehicle wiring structure according to an embodiment of the present invention.

Referring initially to FIG. 1, an electric vehicle structure of an electric vehicle 1 is illustrated in accordance with a first embodiment. While the electric vehicle structure is illustrated as the front end of the electric vehicle 1, the electric vehicle structure can be a rear end of an electric vehicle as needed and/or desired. In drawings, an arrow FR indicates a frontward direction of the vehicle 1, an arrow UP indicates an upward direction of the vehicle 1, and an arrow WD indicates a widthwise direction of the vehicle 1.

Figure 2:
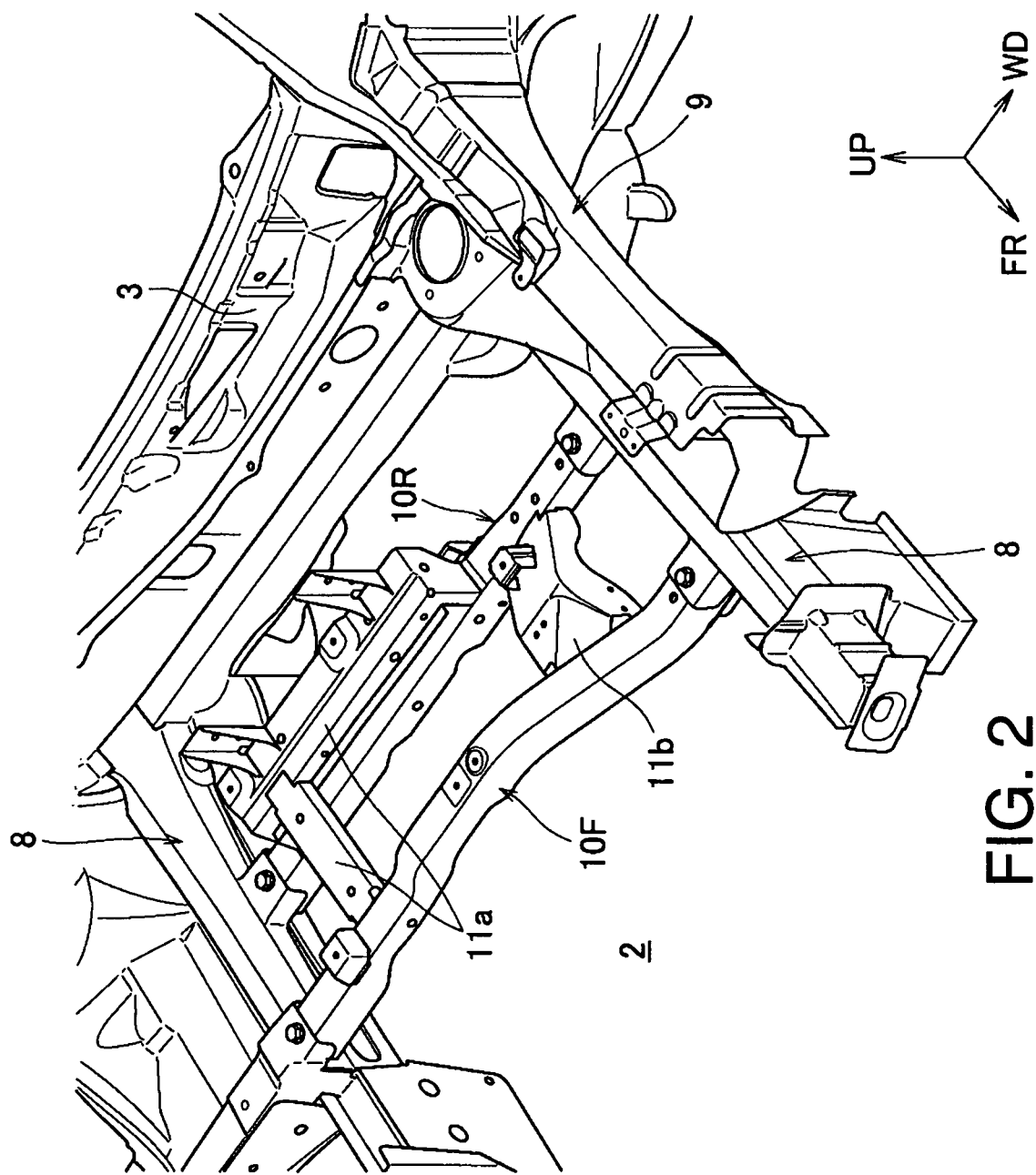
FIG. 2 is a perspective view showing a portion of a vehicle body structure in which an electric vehicle wiring structure according to an embodiment of the present invention is used.

As shown in FIGS. 1 and 2, in this embodiment, the electric vehicle structure includes a front vehicle compartment 2 that is formed in a frontward portion of the vehicle 1. The front vehicle compartment 2 is generally a space surrounded by a dash panel 3 on a reward side, a pair of fender panels (not shown) on the widthwise sides, and a bumper 4a and a grill 4b on a frontward side. An upper opening of the front vehicle compartment 2 is covered with a hood panel 4c such that it can be opened and closed. The front vehicle compartment 2 houses a power unit 5, an inverter 6, a circuit box 7, and various other parts of the vehicle 1. The power unit 5 includes an integrated motor and reduction gear for driving the vehicle 1. The circuit box 7 constitutes one example of an "electrical component" mentioned therein. The circuit box 7 houses a DC/DC converter, fuses, a voltage meter, relays, etc.

As shown in FIG. 2, a front side panel 8 is provided on each of both widthwise sides of the front vehicle compartment 2. The front side panels 8 are arranged to be substantially aligned with a longitudinal direction (front to rear direction) of the vehicle 1. A hood ledge member 9 is provided on each side in a position slightly higher than the corresponding one of the front side members 8. The hood ledge members 9 are arranged to be substantially aligned with a longitudinal direction of the vehicle 1. Cross members 10F and 10R are arranged to span between the left and right front side members 8 substantially along a widthwise direction of the vehicle 1. The cross members 10F and 10R are spaced apart from each other in a longitudinal direction of the vehicle 1. Sub members 11a and 11b are attached to the two cross members 10F and 10R. The sub members 11a and 11b serve to reinforce the cross members 10F and 10R and also serve as a place to attach such components as the inverter 6, the circuit box 7, and a PTC heater (not shown). In this embodiment, the front side members 8, the hood ledge members 9, the cross members 10F and 10R, and the sub members 11a and 11b are all structural members that all serve as vehicle body frame members (vehicle body) of the vehicle 1.

Figure 4:
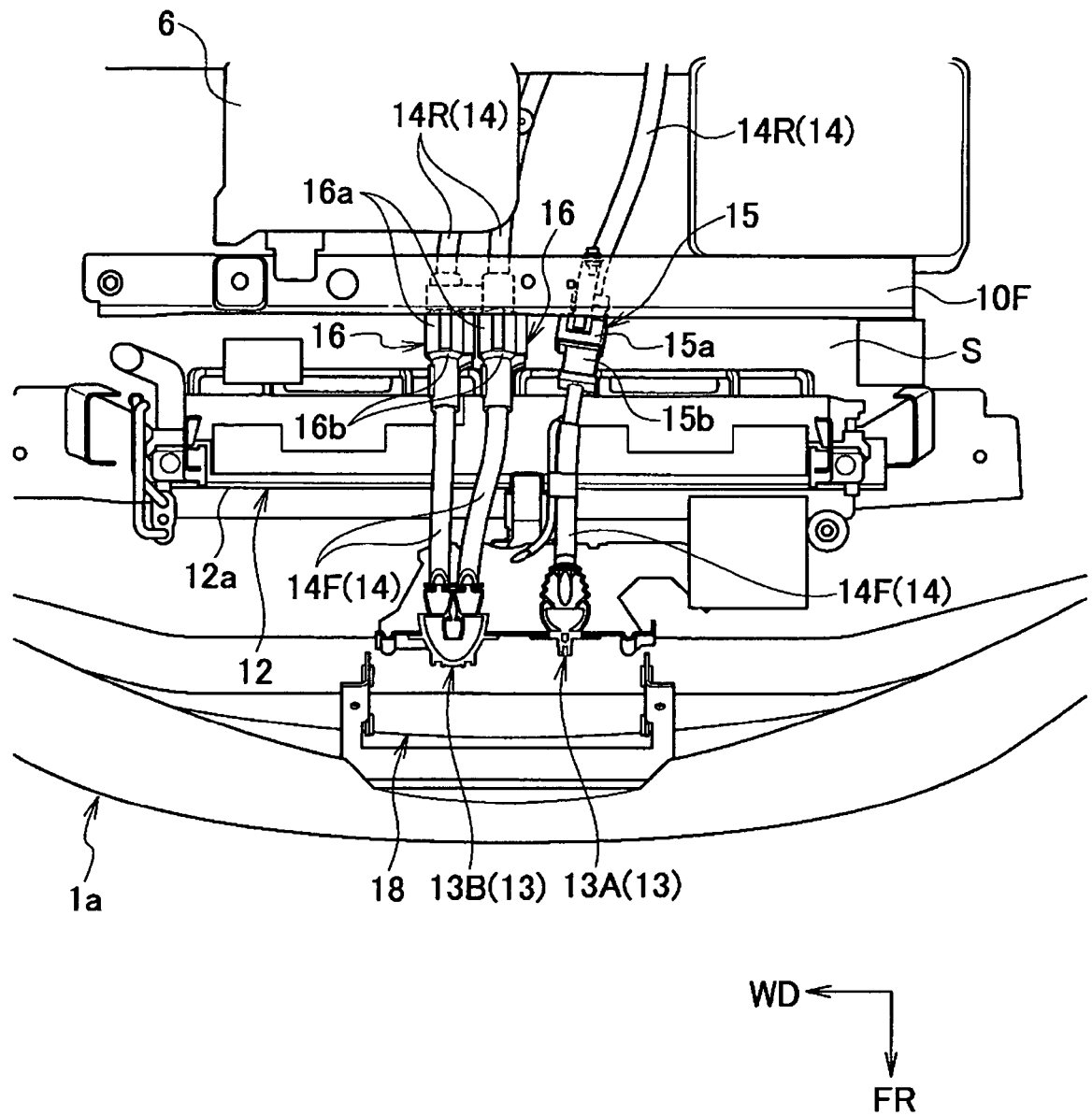
FIG. 4 is a plan view of an electric vehicle wiring structure according to an embodiment of the present invention.

As shown in FIGS. 1 and 4, in this embodiment, the vehicle 1 is provided with a pair of charging ports 13 that serve as connectors for connecting an electrical plug (not shown) of an electric power supply line. The charging ports 13 are provided on a front end portion of the vehicle 1. The charging ports 13 are generically referred to sing reference number 13 when describing common features. However, the charging ports 13 are referred to a first charging port 13A and a second (additional) charging port 13B when describing differences between the charging ports 13A and 13B.

A frontward portion of each of the charging ports 13 is covered with a movable lid formed on at least a portion of the grill 4b. When a plug is to be connected for recharging, the movable lid can be opened so as to expose a frontward-facing portion of the charging port 13. The plug is inserted through an opening 18 from the front and plugged into the charging port 13. This arrangement is relatively conventional and will not be discussed and/or illustrated in detail.

An electric charging harness 14 is connected to each of the charging ports 13. The electric charging harnesses 14 serve to carry electric power transferred through the charging port 13 from the electric power supply line to a battery (not shown) arranged rearward of the front vehicle compartment 2.

Figure 3:
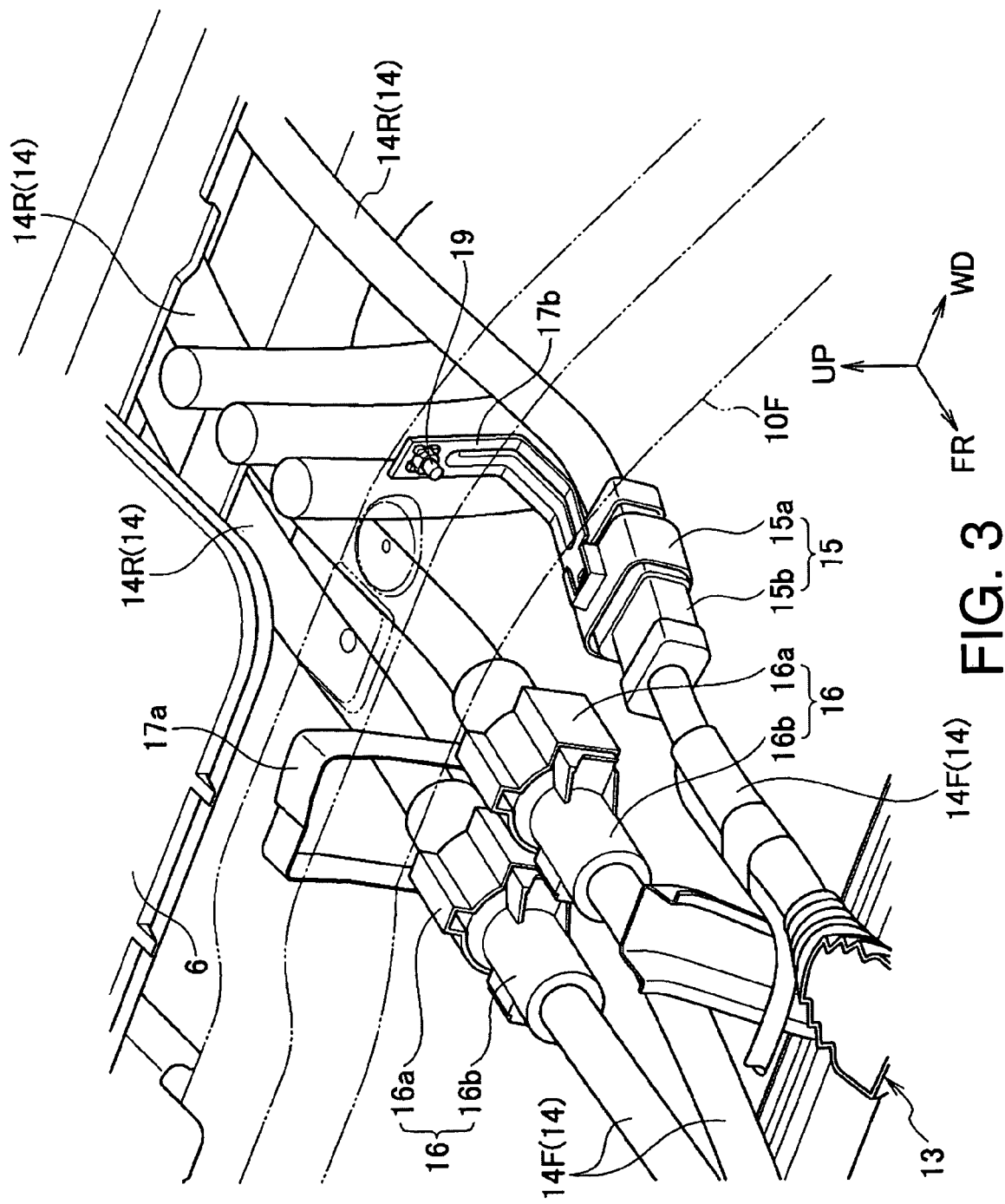
FIG. 3 is a perspective view of an intermediate connector included in an electric vehicle wiring structure according to an embodiment of the present invention.

In this embodiment, there are two charging ports 13. The charging port 13A is configured and arranged for normal charging of the battery at a comparatively low voltage. The charging port 13B is configured and arranged for rapid charging of the battery at a comparatively high voltage. As seen in FIGS. 3 and 4, a single electric charging harness 14 is connected to the charging port 13A, while two of the electric charging harnesses 14 are connected to the charging port 13B. The first connecting end of each of the electric charging harness 14, which is opposite the end connected to the respective charging port 13, is connected to either the circuit box 7, a junction box (not shown), a battery (not shown), or other electrical component arranged rearward of the charging ports 13.

An intermediate connector 15 or 16 is provided at an intermediate position long each of the harnesses 14 connected to the charging ports 13. Each of the harnesses 14 is divided into a frontward wiring portion 14F and a rearward wiring portion 14R. The frontward wiring portion 14F is located on the charging port 13 side of the intermediate connector 15 or 16. The rearward wiring portion 14R is located on the electrical component side of the intermediate connector 15 or 16. The frontward wiring portion 14F and the rearward wiring portion 14R of each of the electric charging harnesses 14 are detachably connected together by the respective intermediate connector 15 or 16 such that the frontward and rearward wiring portions 14F and can be repeatedly connected and disconnected connection. Therefore, when maintenance or repairs are performed on one of the charging ports 13, a subassembly unit comprising the charging port 13 and the frontward wiring portion 14F of the electric charging harness 14 can be removed by disconnecting the intermediate connector 15 or 16 and separating the frontward wiring portion 14F from the rearward wiring portion 14R.

In this embodiment, the intermediate connectors 15 and 16 are arranged inside the front vehicle compartment 2. As a result, the lengths of the frontward portions 14F of the harnesses 14 can be made shorter than if the intermediate connectors 15 and 16 were arranged, for example, under a floor of a passenger compartment located rearward of the front vehicle compartment 2. Additionally, since each of the subassemblies includes only one of the charging ports 13 and only one or two of the frontward wiring portions 14F, the subassemblies of the electric charging harness 14 can be made to be a comparatively small and lightweight unit.

As shown in FIGS. 1 to 4, in this embodiment, the frontward wiring portion 14F of each of the harnesses 14 is shorter than the rearward wiring portion 14R. As a result, the frontward portions 14F of the harnesses 14 can be made even shorter and the subassemblies each including only one of the charging ports 13 and only one or two of the frontward wiring portions 14F can be made to be a comparatively small and lightweight unit.

Each of the intermediate connectors 15 and 16 has a female mating part 15a or 16a and a male mating part 15b or 16b. When the male mating part 15b or 16b is inserted into the female mating part 15a or 16a such that the two parts are snugly attached, the internal conductors thereof become electrically connected to each other. In this embodiment, the female mating part 15a or 16a of each intermediate connector 15 or 16 is attached to the frontward end of the rearward wiring portion 14R of the electric charging harness 14 and the male mating part 15b or 16b is attached to the rearward end of the frontward wiring portion 14F. However, it is acceptable for the arrangement of the female and male mating parts to be reversed.

The mating part of each of the intermediate connectors 15 and 16 that is connected to the rearward wiring portion 14R of the electric charging harness 14 (e.g., the female mating part 15a or 16a in this embodiment) is fastened to the cross member 10F by a bracket 17a or 17b. The task of connecting and disconnecting the female portion 15a or 16a to and from the male portion 15b or 16b would be cumbersome if one of the two portions was not secured to the vehicle body or otherwise supported. In this embodiment, one mating part (e.g., the female mating part 15a or 16a in this embodiment) is fastened to the vehicle body such that the work of connecting and disconnecting the intermediate connectors 15 and 16 can be accomplished easily and smoothly. More specifically, for example, a worker can connect and disconnect the female mating part 15a or 16a to and from the male mating part 15b or 16b with one hand.

As shown in FIG. 4, in this embodiment, the intermediate connectors 15 and 16 are arranged to be offset from the inverter 6, which is a comparatively large electrical component arranged inside the front vehicle compartment 2, in a horizontal direction in a plan view. This arrangement reduces the degree to which the inverter 6 becomes an obstruction and diminishes the efficiency with which the task of connecting and disconnecting the female mating parts 15a and 16a to and from the male mating parts 15b and 16b can be accomplished. Although in this embodiment the intermediate connectors 15 and 16 are offset from the inverter 6 in a forward direction, it is also acceptable for the intermediate connectors 15 and 16 to be offset laterally or rearwardly. However, by arranging the intermediate connectors 15 and 16 in positions forward of the inverter 6 as is done in this embodiment, the distance from the charging ports 13 to the intermediate connectors 15 and 16 can be shortened and the lengths of the frontward portions 14F of the harnesses 14 can be shortened. As a result, each of the subassemblies includes the charging port 13 and the frontward wiring portion 14F of the electric charging harness 14 can be made to be a comparatively small and lightweight unit.

In this embodiment, as shown in FIG. 1, the intermediate connectors 15 and 16 are arranged in the front vehicle compartment 2 such that a space S exists in a vertical direction directly above and/or directly below the intermediate connectors 15 and 16 (both directly above and directly below in this embodiment). As a result, the task of connecting and disconnecting the female mating parts 15a and 16a to and from the male mating parts 15b and 16b can be accomplished more efficiently because a persons hands or a tool can reach the intermediate connectors 15 and 16 easily through the space S.

In this embodiment, the intermediate connectors 15 and 16 are arranged rearward of a front end 12a of a radiator core support assembly 12 that is arranged in a frontward portion of the front vehicle compartment 2 so as to span in a widthwise direction of the vehicle 1. The radiator core support assembly 12 includes a radiator core support and a condenser and other parts that are mounted to the radiator core support. The radiator core support is a frame like structure that functions as a portion of the vehicle body frame by spanning between frontward end portions of the front side members 8. When the vehicle 1 undergoes a front collision, the radiator core support bears most of the load imparted from the front collision. Since the intermediate connectors 15 and 16 are arranged rearward of the front end 12a of the radiator core support assembly 12, the intermediate connectors 15 and 16 can be better protected against damage than if they were arranged in front of the front end 12a because the radiator core support assembly 12 bears the load coming from the front.

In this embodiment, since the intermediate connectors 15 and 16 are arranged rearwardly of the charging supports 13 so as to be separated from the charging supports 13 by the frontward portions 14F of the harnesses 14, the frontward wiring portion 14F of each of the harnesses 14 can be bent into a U-like shape or an S-like shape because the electric charging harness 14 is pliable. Consequently, the load of a collision can be prevented from being imparted to one of the intermediate connectors 15 or 16 through the electric charging harness 14 due to deformation of the electric charging harness 14. As a result, the intermediate connectors 15 and 16 can be protected even better in a collision.

As explained previously, in this embodiment, the intermediate connector 15 or 16 is provided in an intermediate position along the electric charging harness 14 serving to connect the charging port 13 to an electrical component arranged rearward of the charging port 13. The intermediate connector 15 or 16 serves to detachably connect the frontward wiring portion 14F and the rearward wiring portion 14R of the electric charging harness 14 together. With this configuration, when it is necessary to replace the charging port 13, only the portion of the electric charging harness 14 located on the charging port 13 side of the intermediate connector 15 or 16 is replaced along with the charging port 13 (in this embodiment, the subassembly comprising the charging port 13 and the portion of the electric charging harness 14 located on the charging port 13 side of the intermediate connector 15 or 16 (i.e., the frontward wiring portion 14F) is replaced). Thus, the time and effort required to replace the charging port 13 can be reduced in comparison with a configuration in which the entire electric charging harness 14 must be replace along with the charging port 13. Also, since the intermediate connector 15 or 16 can be arranged to be separated from the charging port 13, the intermediate connector 15 or 16 can be prevented from being damaged in situations where the charging port 13 is damaged due to a vehicle collision or the like. As a result, the time and effort required to replace the charging port 13 can be prevented from increasing due to the intermediate connector 15 or 16 becoming damaged.

In this embodiment, the intermediate connectors 15 and 16 are provided inside the front vehicle compartment 2. Since the front vehicle compartment 2 is configured and arranged such that a space for inserting a hand or a tool (e.g., the aforementioned space S) can be readily secured, the female mating part 15a or 16a and the male mating part 15b or 16b of each of the intermediate connectors 15 and 16 can be connected and disconnected to and from each other more easily. Since the front vehicle compartment 2 is formed in a frontward portion of the vehicle, so long as the charging ports 13 are provided on a front end portion of the vehicle 1, the portion of the each of the harnesses 14 located between the charging port 13 and the intermediate connector 15 or 16 (i.e., frontward portions 14F) can be made even shorter and the portion spanning from the intermediate connector 15 or 16 to the charging port 13 (i.e., the subassembly comprising the charging port 13 and the frontward wiring portion 14F of the electric charging harness 14) can be made to be a comparatively small and lightweight unit. As a result, it is easier to remove and install the charging port 13 and the portion of the electric charging harness 14 located on the charging port 13 side of the intermediate connector 15 or 16, and there is less waste of the electric charging harness 14 because the portion of the electric charging harness 14 replaced when the charging port 13 is replaced is comparatively short.

In this embodiment, the length of the frontward wiring portion 14F is shorter than the length of the rearward wiring portion 14R. As a result, the charging port 13 and the portion of the electric charging harness 14 located on the charging port 13 side of the intermediate connector 15 or 16 (i.e., the subassembly comprising the charging port 13 and the frontward wiring portion 14F of the electric charging harness 14) can be made to be smaller and lighter in weight than a case in which the frontward wiring portion 14F is longer than the rearward wiring portion 14R. As a result, it is easier to remove and install the charging port 13 and the portion of the electric charging harness 14 located on the charging port 13 side of the intermediate connector 15 or 16, and there is less waste of the electric charging harness 14 because the portion of the electric charging harness 14 replaced when the charging port 13 is replaced is comparatively short.

In this embodiment, the intermediate connectors 15 and 16 are arranged reward of a front end 12a of a radiator core support assembly 12 arranged in a frontward portion of the front vehicle compartment 2 so as to span in a widthwise direction of the vehicle. As a result, when the vehicle 1 undergoes a collision, the radiator core support assembly 12 bears most of the load imparted to the vehicle 1 and the intermediate connectors 15 and 16 are less likely to be damaged than if the intermediate connectors 15 and 16 were arranged in front of the front end 12a.

In this embodiment, the intermediate connectors 15 and 16 are arranged to be offset from the inverter 6 (which arranged inside the front vehicle compartment 2) in a horizontal direction in a plan view. This arrangement reduces the degree to which the inverter 6 becomes an obstruction and diminishes the efficiency with which the task of connecting and disconnecting the female mating parts 15a and 16a to and from the male mating parts 15b and 16b can be accomplished.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "frontward", "rearward", "above", "downward", "vertical", "horizontal", "below" and "transverse" as well as any other similar directional terms refer to those directions of an electric vehicle having the electric vehicle structure. Accordingly, these terms, as utilized to describe the electric vehicle structure should be interpreted relative to an electric vehicle having the electric vehicle structure.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. In other words, although in the embodiment the charging ports are provided on a frontward end portion of the vehicle, the invention is not limited to such an arrangement. Regardless of the particular positions of the charging ports and the intermediate connectors, the same operational effects can be obtained as with the embodiment so long as a harness exists between a charging port and an intermediate connector and the charging port and the intermediate connector can be arranged to be separated (spaced apart) from each other. Thus, the foregoing descriptions of the embodiments according to the present invention are provided for illustration only, and not for the purpose of limiting the invention as defined by the appended claims and their equivalents.

What is claimed is:

1. An electric vehicle structure comprising:
a charging port configured to be provided on a front end of a vehicle, the charging port including a connector that is configured to be connected to an electrical plug of an electric power supply line;
an electric charging harness including a first wiring portion electrically connected to the charging port and a second wiring portion configured to be connected to an electrical component of the vehicle; and
an intermediate connector releasably connecting the first wiring portion of the electric charging harness to the second wiring portion of the electric charging harness with a repeatable connecting and disconnecting connection, the intermediate connector being arranged rearward of a front end of a radiator core support assembly spanning across in a widthwise direction of the vehicle and being spaced separately from the charging port such that the intermediate connector and the charging port are disposed on opposite sides of the radiator core support assembly.

2. The electric vehicle structure as recited in claim 1, wherein
the first wiring portion is a frontward wiring portion, which extends longitudinally frontward of the intermediate connector, and the second wiring portion is a rearward wiring portion, which extends longitudinally rearward of the intermediate connector.

3. The electric vehicle structure as recited in claim 1, wherein
the intermediate connector is provided in a front compartment formed in a frontward portion of the vehicle.

4. The electric vehicle structure as recited in claim 1, wherein
the first wiring portion of the electric charging harness has a length that is shorter than a length of the second wiring portion of the electric charging harness.

5. The electric vehicle structure as recited in claim 1, wherein
the intermediate connector is arranged to be offset in a horizontal direction from an inverter arranged inside the vehicle as viewed in a plan view.

6. The electric vehicle structure as recited claim 1, further comprising
an additional charging port electrically connected to two additional intermediate connectors by two additional first wiring portions, respectively, and two additional second wiring portions being electrically connected to the two additional intermediate connectors, respectively.

7. The electric vehicle structure as recited in claim 1, wherein
the intermediate connector includes a first mating part attached to the first wiring portion and a second mating part attached to the second wiring portion, with the second mating part having a bracket configured to be mounted to a cross member of the vehicle.

8. The electric vehicle structure as recited in claim 1, wherein
the intermediate connector is located in a front vehicle compartment with the front vehicle compartment having an unobstructed access space existing in a vertical direction at least one of directly below the intermediate connector to an area below the vehicle and directly above the intermediate connector until a hood panel of the vehicle.

9. The electric vehicle structure as recited in claim 1, wherein
the intermediate connector is arranged rearward of the vehicle with respect to the charging port.

10. The electric vehicle structure as recited in claim 2, wherein
the intermediate connector is provided in a front compartment formed in a frontward portion of the vehicle.

11. The electric vehicle structure as recited in claim 2, wherein
the first wiring portion of the electric charging harness has a length that is shorter than a length of the second wiring portion of the electric charging harness.

12. The electric vehicle structure as recited in claim 2, wherein
the intermediate connector is arranged to be offset in a horizontal direction from an inverter arranged inside the vehicle as viewed in a plan view.

13. The electric vehicle structure as recited claim 2, further comprising
an additional charging port electrically connected to two additional intermediate connectors by two additional first wiring portions, respectively, and two additional second wiring portions being electrically connected to the two additional intermediate connectors, respectively.

14. The electric vehicle structure as recited in claim 2, wherein
the intermediate connector includes a first mating part attached to the first wiring portion and a second mating part attached to the second wiring portion, with the second mating part having a bracket configured to be mounted to a cross member of the vehicle.

15. The electric vehicle structure as recited in claim 2, wherein
the intermediate connector is located in a front vehicle compartment with the front vehicle compartment having an unobstructed access space existing in a vertical direction at least one of directly below the intermediate connector to an area below the vehicle and directly above the intermediate connector until a hood panel of the vehicle.

16. The electric vehicle structure as recited in claim 2, wherein the intermediate connector is arranged rearward of the vehicle with respect to the charging port.

* * * * *